(12) United States Patent
Paulsen et al.

(10) Patent No.: US 7,309,041 B2
(45) Date of Patent: Dec. 18, 2007

(54) RETRACTOR AND HOUSING FOR A RETRACTOR

(75) Inventors: Rudiger Paulsen, Ulm (DE); Robert Fleischmann, Neu-Ulm (DE); Thomas Grasser, Illerrieden (DE); Oskar Scholler, Vohringen (DE); Stefan Lambrecht, Unterelchingen (DE); Jochen Benz, Neu-Ulm (DE)

(73) Assignee: Takata Corporation, Tokyo (JP)

( * ) Notice: Subject to any disclaimer, the term of this patent is extended or adjusted under 35 U.S.C. 154(b) by 261 days.

(21) Appl. No.: 10/841,839

(22) Filed: May 10, 2004

(65) Prior Publication Data

US 2005/0023402 A1 Feb. 3, 2005

(30) Foreign Application Priority Data

May 8, 2003 (DE) .............................. 103 20 836

(51) Int. Cl.
*B65H 75/48* (2006.01)
(52) U.S. Cl. .................................... 242/375; 242/375.3
(58) Field of Classification Search ................ 242/375, 242/375.3, 375.1, 375.2
See application file for complete search history.

(56) References Cited

U.S. PATENT DOCUMENTS

| | | | |
|---|---|---|---|
| 4,159,809 A | 7/1979 | Rawson | |
| 4,301,977 A * | 11/1981 | Yang | 242/375.3 |
| 4,340,191 A | 7/1982 | Zavatsky | |
| 4,570,872 A | 2/1986 | Tsujimura et al. | |
| 4,776,574 A | 10/1988 | Krambeck | |
| 5,060,883 A * | 10/1991 | Ohya et al. | 242/373 |
| 5,112,005 A * | 5/1992 | Hoshihara | 242/381 |
| 5,411,222 A * | 5/1995 | Gray et al. | 242/375.3 |
| 5,443,223 A | 8/1995 | Yosin et al. | |
| 5,823,457 A * | 10/1998 | Jahn et al. | 242/372 |
| 6,256,848 B1 * | 7/2001 | McCulloch | 24/633 |
| 6,390,404 B2 * | 5/2002 | McCulloch | 242/375 |

FOREIGN PATENT DOCUMENTS

| | | |
|---|---|---|
| DE | 29 00 104 | 7/1979 |
| EP | 0 115 919 | 8/1984 |

* cited by examiner

*Primary Examiner*—Gene O. Crawford
*Assistant Examiner*—Sang Kim
(74) *Attorney, Agent, or Firm*—Foley & Lardner LLP

(57) ABSTRACT

Belt retractor and a belt-retractor spring-cassette housing for a belt retractor. The belt-retractor spring-cassette housing can be installed in a particularly simple and therefore cost-effective manner. The belt-retractor spring-cassette housing has a spring core and a driving spring which is held in the spring core, the belt-retractor spring-cassette housing and/or the spring core are designed symmetrically so that the driving spring can have any desired torque direction.

14 Claims, 7 Drawing Sheets

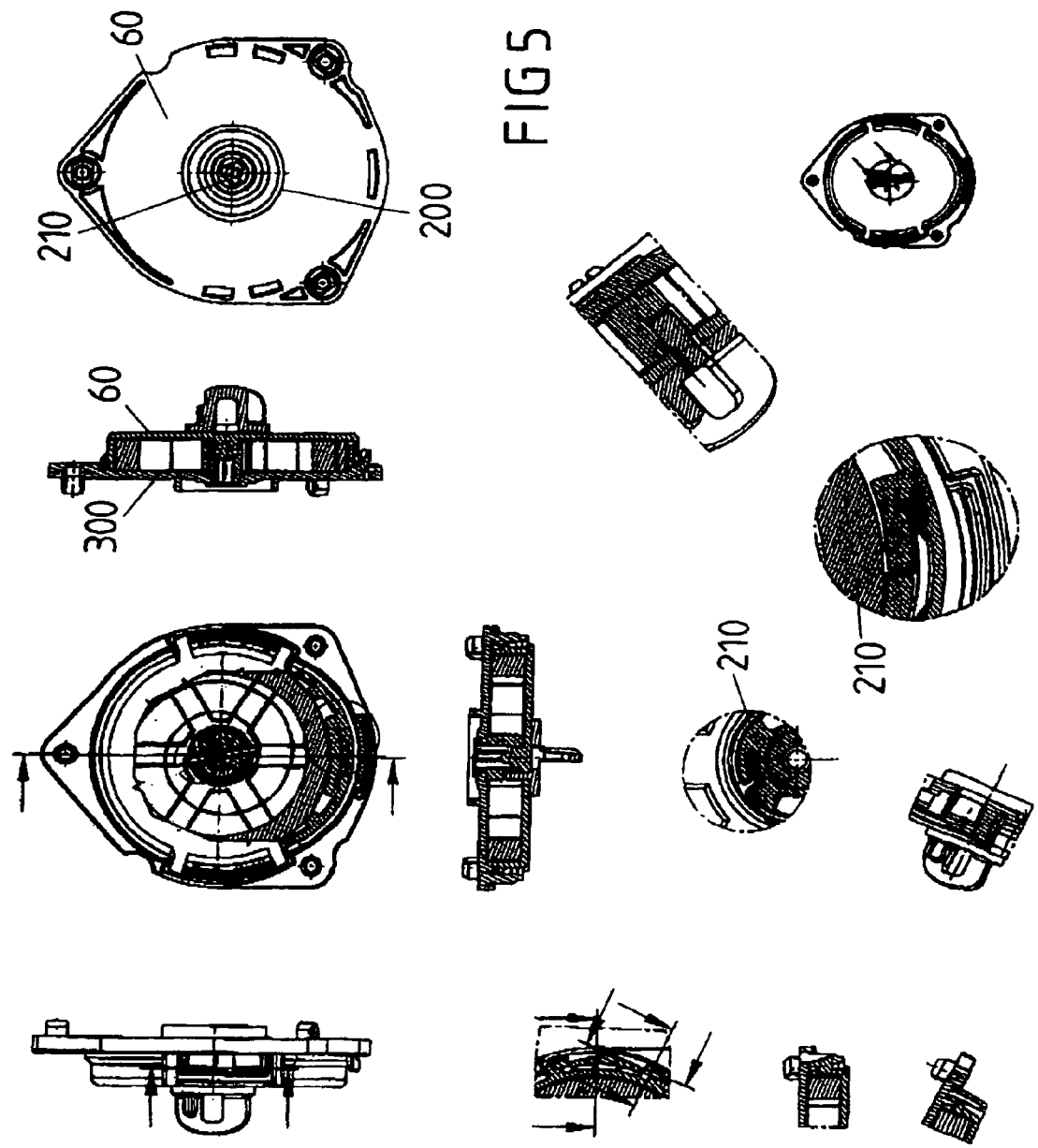

RETRACTOR AND HOUSING FOR A RETRACTOR

BACKGROUND OF THE INVENTION

The invention relates to a belt-retractor spring-cassette housing which can be connected to a belt retractor. Belt-retractor spring-cassette housings or covers typically contain a driving spring which exerts a torque on a belt spindle of the belt retractor so that the seat belt is retracted.

SUMMARY OF THE INVENTION

An embodiment of the invention includes providing a belt-retractor spring-cassette housing which can be produced and installed in a particularly simple and therefore cost-effective manner.

According to an embodiment of the present invention, a belt retractor housing is provided. The belt-retractor spring-cassette housing and/or a spring core of the belt-retractor spring-cassette housing is designed symmetrically so that the driving spring of the belt-retractor spring-cassette housing can have any desired torque direction.

According to an embodiment of the invention, one substantial advantage of the retractor housing is the ability to use the retractor for different retracting directions of rotation or belt-retracting directions of rotation. Depending on the desired belt-retracting direction of rotation, a driving spring having the matching or corresponding torque direction is installed into the belt-retractor spring-cassette housing. Due to the symmetrical construction of the spring core and/or of the belt-retractor spring-cassette housing, this is readily possible.

A belt-retractor spring-cassette housing can be formed in a particularly simple and therefore advantageous manner by a belt-retractor spring-cassette cover.

According to an embodiment of the invention, a belt retractor is provided that can be produced in a particularly simple and therefore cost-effective manner.

According to an embodiment of the present invention, a belt retractor including a spring-cassette connecting plate to which a belt-retractor spring-cassette housing can be connected is provided.

One substantial advantage of the belt retractor according to the invention is the fact that the retractor can be used very universally because, owing to the design of the spring-cassette connecting plate, the belt-retractor spring-cassette housing or belt-retractor spring-cassette cover already explained above can be used with any desired belt-retracting direction of rotation. The belt-retracting direction of rotation of the belt retractor is therefore determined by the torque direction of the driving spring of the belt-retractor spring-cassette housing.

The spring-cassette connecting plate and the belt retractor overall are advantageously constructed symmetrically so that any desired belt-retracting directions of rotation of the belt spindle are possible, and the belt-retracting direction of the belt retractor is therefore established exclusively by the torque direction of the driving spring of the belt-retractor spring-cassette housing or of the belt-retractor spring-cassette cover. The belt retractor can therefore be used on any desired side of the vehicle, an appropriate driving spring merely needing to be inserted.

In addition, it is regarded as being advantageous if the belt retractor has a sensor device, in particular a belt-strap sensor device or a vehicle sensor. The sensor device is preferably designed so that a belt-retractor spring-cassette housing can be fitted on it.

According to a further preferred refinement of the belt retractor, provision is made for the sensor device to be designed so that, when the belt-retractor spring-cassette housing is connected, a transmission of force between the driving spring and the belt spindle of the belt retractor is ensured. According to this embodiment, the spring-cassette connecting plate can preferably be formed by an outer side of the sensor device. As an alternative, the sensor device and the spring-cassette connecting plate may be arranged on different sides of the belt retractor.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 5 shows construction drawings for the belt-retractor spring-cassette cover according to FIGS. 4a and 4b in detail.

DETAILED DESCRIPTION

Figure 1:
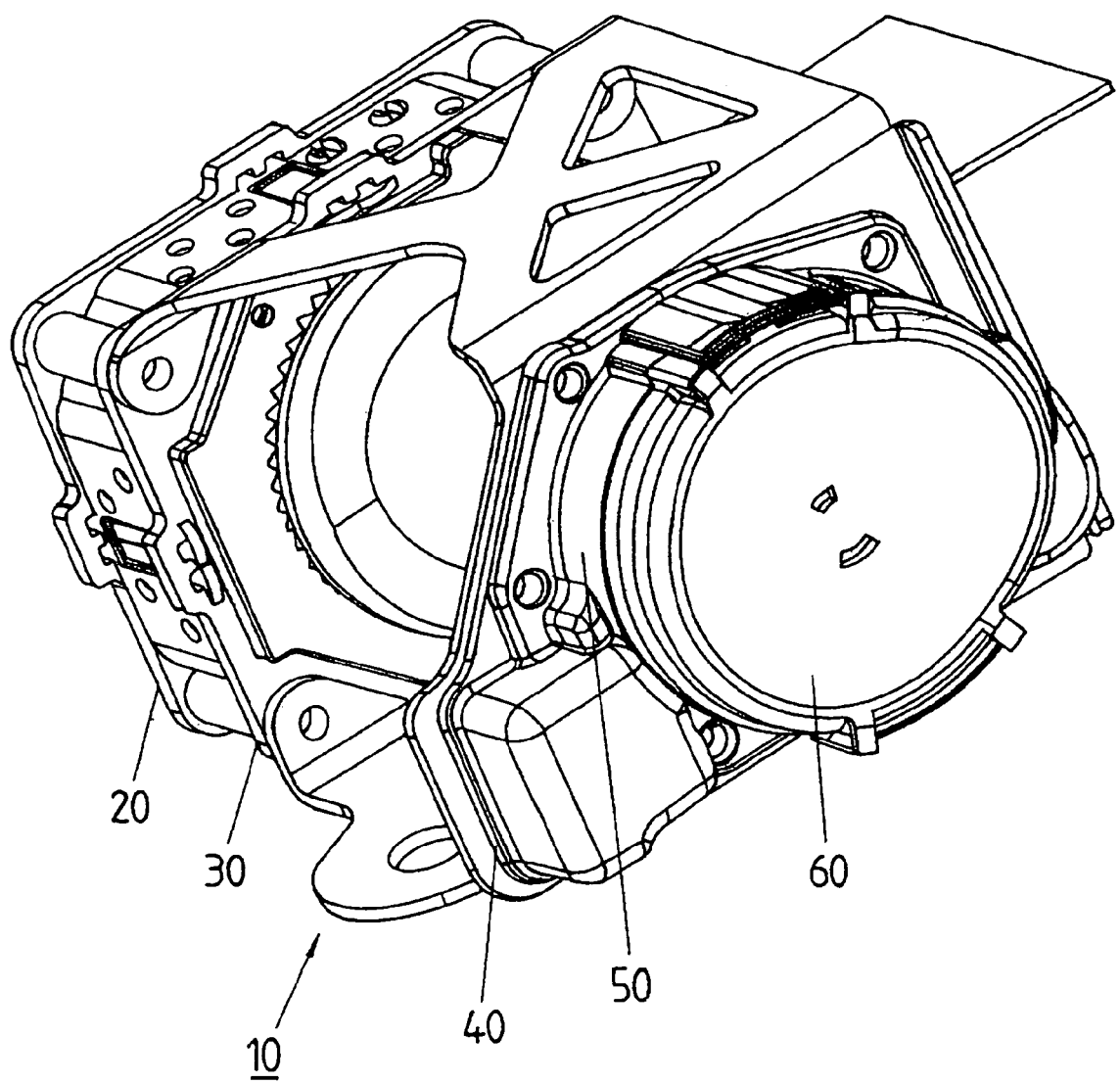
FIG. 1 shows a first exemplary embodiment for a belt retractor according to the invention, in which an exemplary embodiment for a belt-retractor spring-cassette cover according to the invention is fitted on the same side as a sensor device of the belt retractor.
Figure 6:
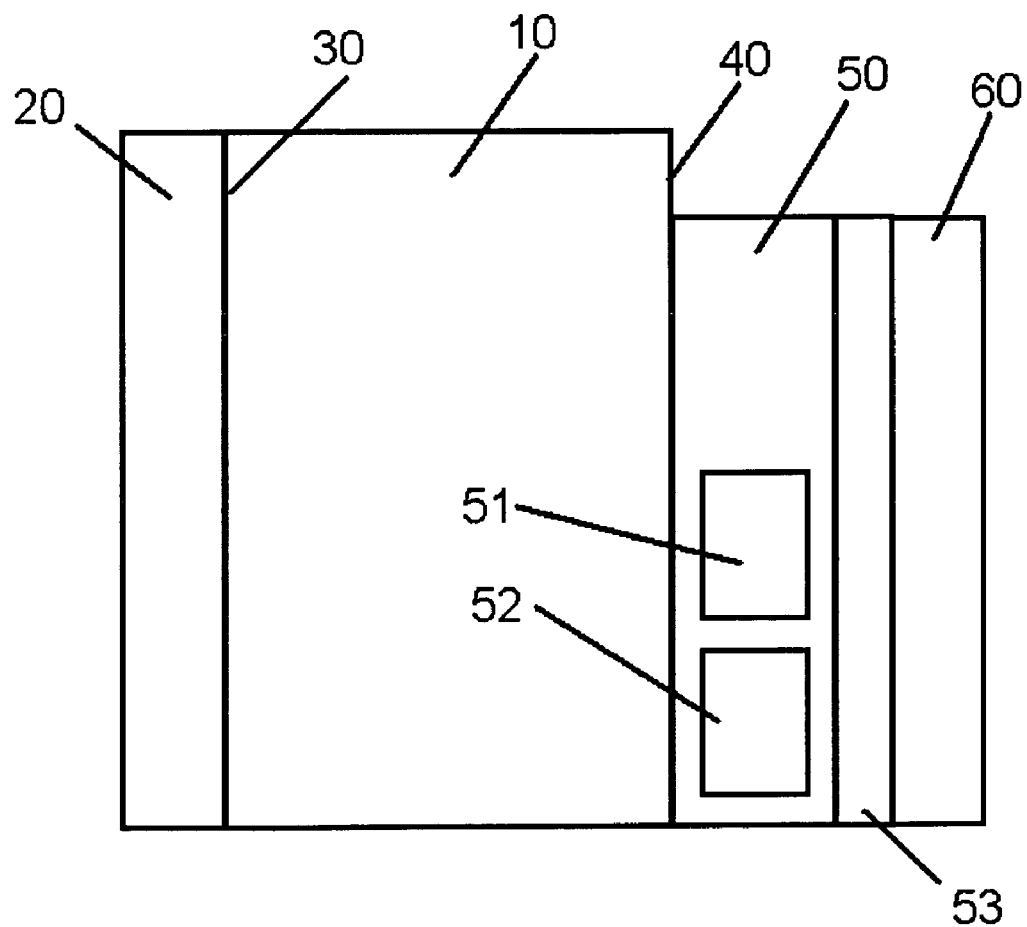
FIG. 6 shows a schematic drawing of the belt retractor according to FIG. 1.

FIG. 1 and FIG. 6 show a belt retractor 10 which is equipped on one side 30 of the belt retractor with a tightening device 20. A sensor device 50 is fitted on the side 40 ("mechanism side") lying opposite the side 30, which the sensor device may contain, for example, a belt-strap sensor device 51 and/or a vehicle sensor 52. Formed on the outer side of the sensor device 50 is a spring-cassette connecting plate 53 on which a belt-retractor spring-cassette cover 60 is fastened. The belt-retractor spring-cassette cover 60 is therefore situated on the "mechanism side" 40 of the belt retractor 10.

In the belt retractor 10, the tightening device 20 is arranged on the side at the rear in FIG. 1; the sensor device 50 and the belt-retractor spring-cassette cover 60 are attached on the front side in FIG. 1. The belt retractor is preferably designed "mirror symmetrically" so that the arrangement of the tightening device 20, of the sensor device 50 and of the belt-retractor spring-cassette cover 60 may also be the other way around. This means specifically that, in the belt retractor 10, the tightening device 20 may also be arranged on the front side in FIG. 1; the sensor device 50 and the belt-retractor spring-cassette cover 60 would then have to be attached on the rear side in FIG. 1.

Figure 2:
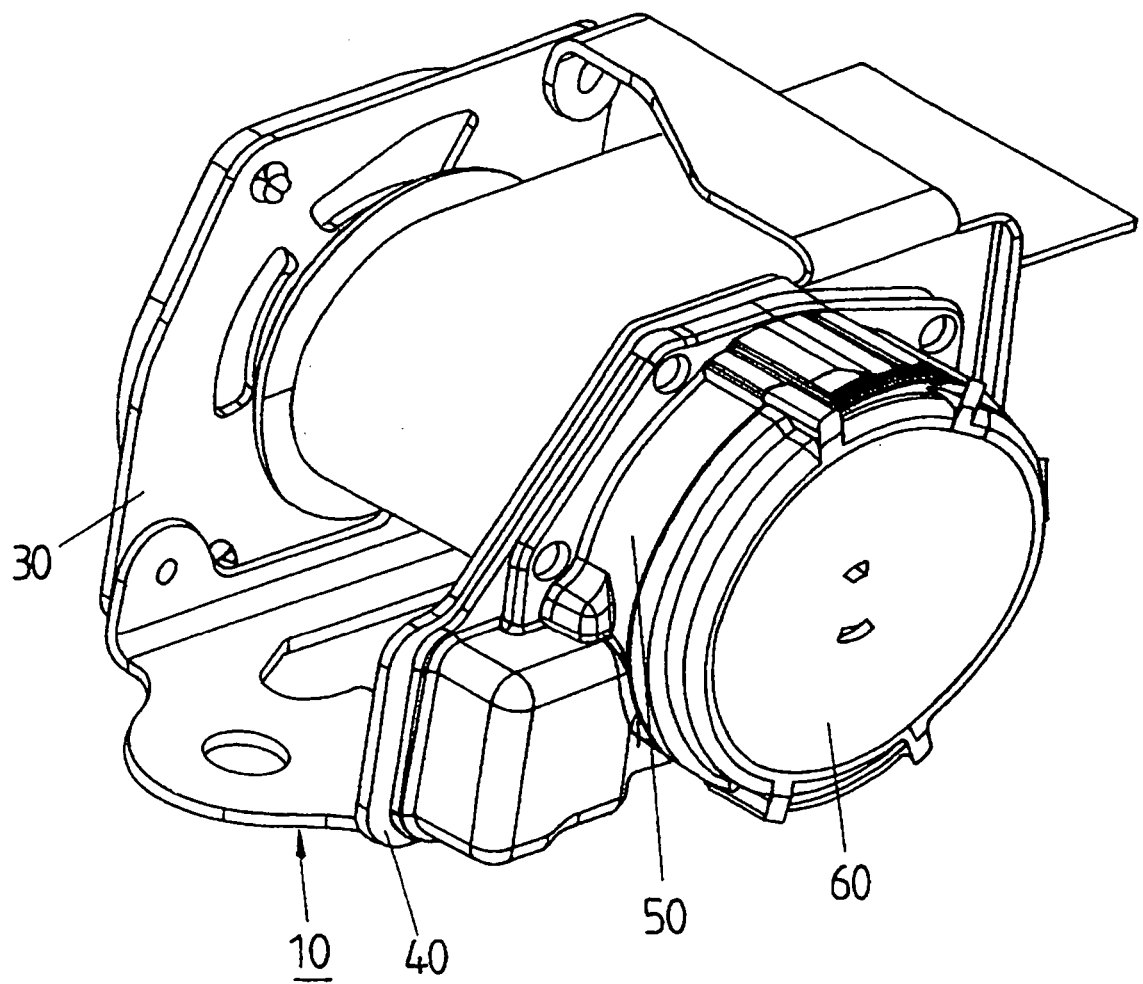
FIG. 2 shows a second exemplary embodiment for a belt retractor according to the invention, in which an exemplary embodiment for a belt-retractor spring-cassette cover according to the invention is fitted on the same side as a sensor device of the belt retractor.

FIG. 2 illustrates a further exemplary embodiment for a belt retractor according to the invention. In contrast with the belt retractor 10 according to FIG. 1, the belt retractor according to FIG. 2 does not have a tightening device 20. Also in the belt retractor according to FIG. 2, the belt-retractor spring-cassette cover 60 is arranged on the "mechanism side" 40 of the belt retractor.

Figure 3:
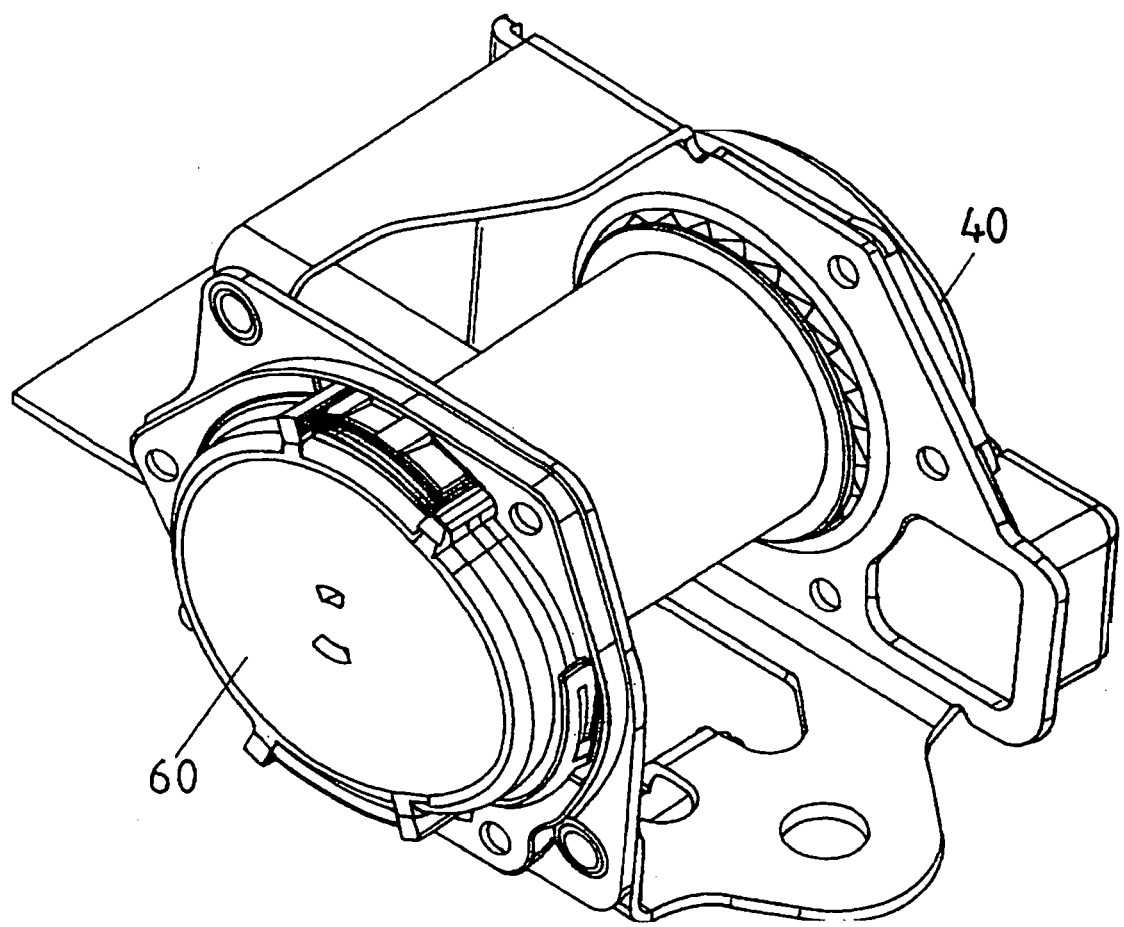
FIG. 3 shows a third exemplary embodiment for a belt retractor according to the invention, in which the sensor device of the belt retractor and the spring-cassette side of the belt retractor are situated on different sides.

FIG. 3 shows an exemplary embodiment for a belt retractor, in which the mechanism side 40 (side with the sensor device 50) is separated from the spring-cassette connecting plate and the belt-retractor spring-cassette cover 60; specifically, the sensor device 50 and the belt-retractor spring-cassette cover 60 are arranged on different sides of the belt retractor.

The belt-retractor spring-cassette cover 60 is therefore designed so that it can be fitted both on the mechanism side 40—and therefore on the outer side of the sensor device 50—and also on the opposite side 30.

Figure 4A:
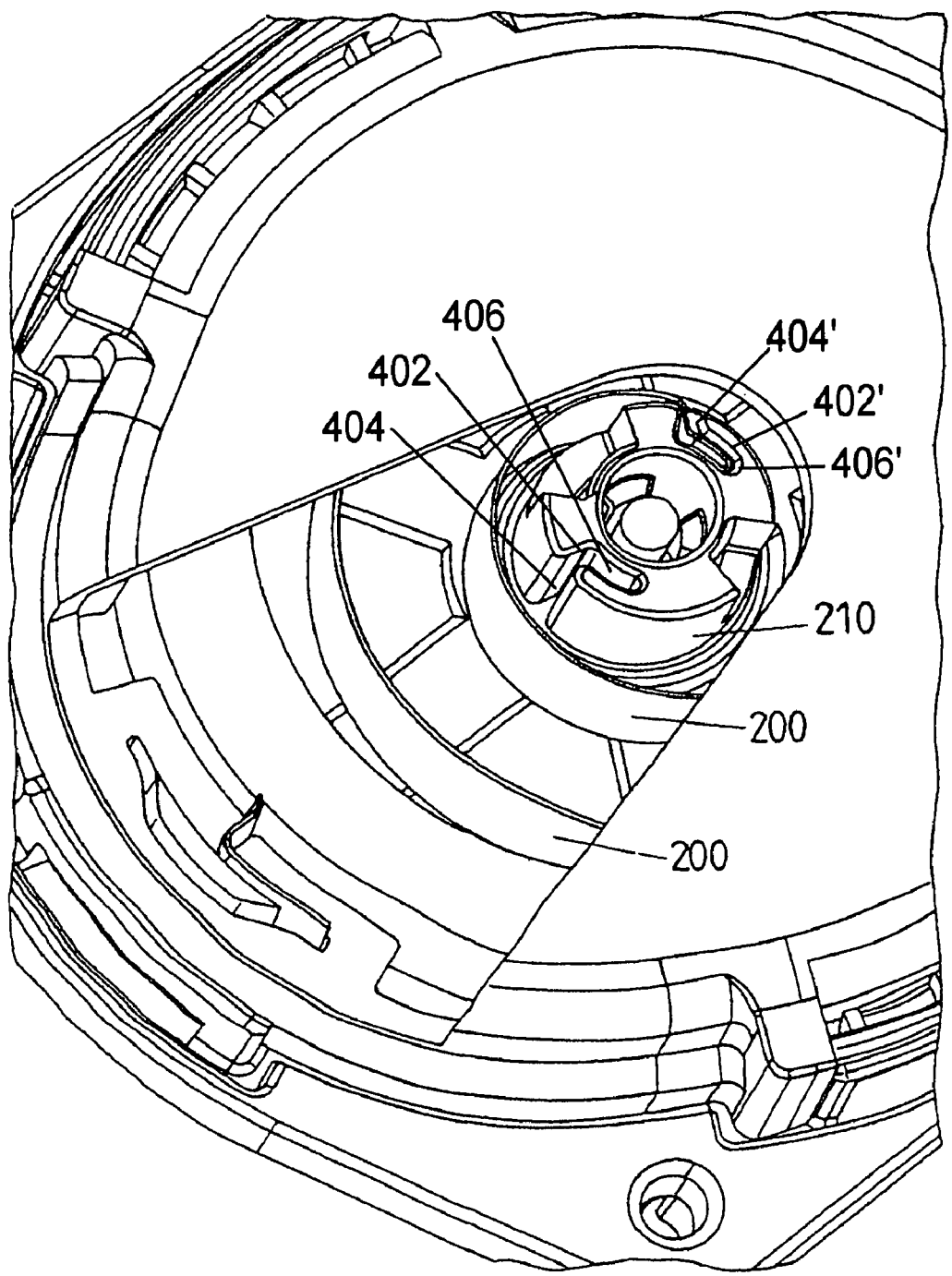
FIGS. 4a and 4b show an exemplary embodiment for a belt-retractor spring-cassette cover according to the invention.
Figure 4B:
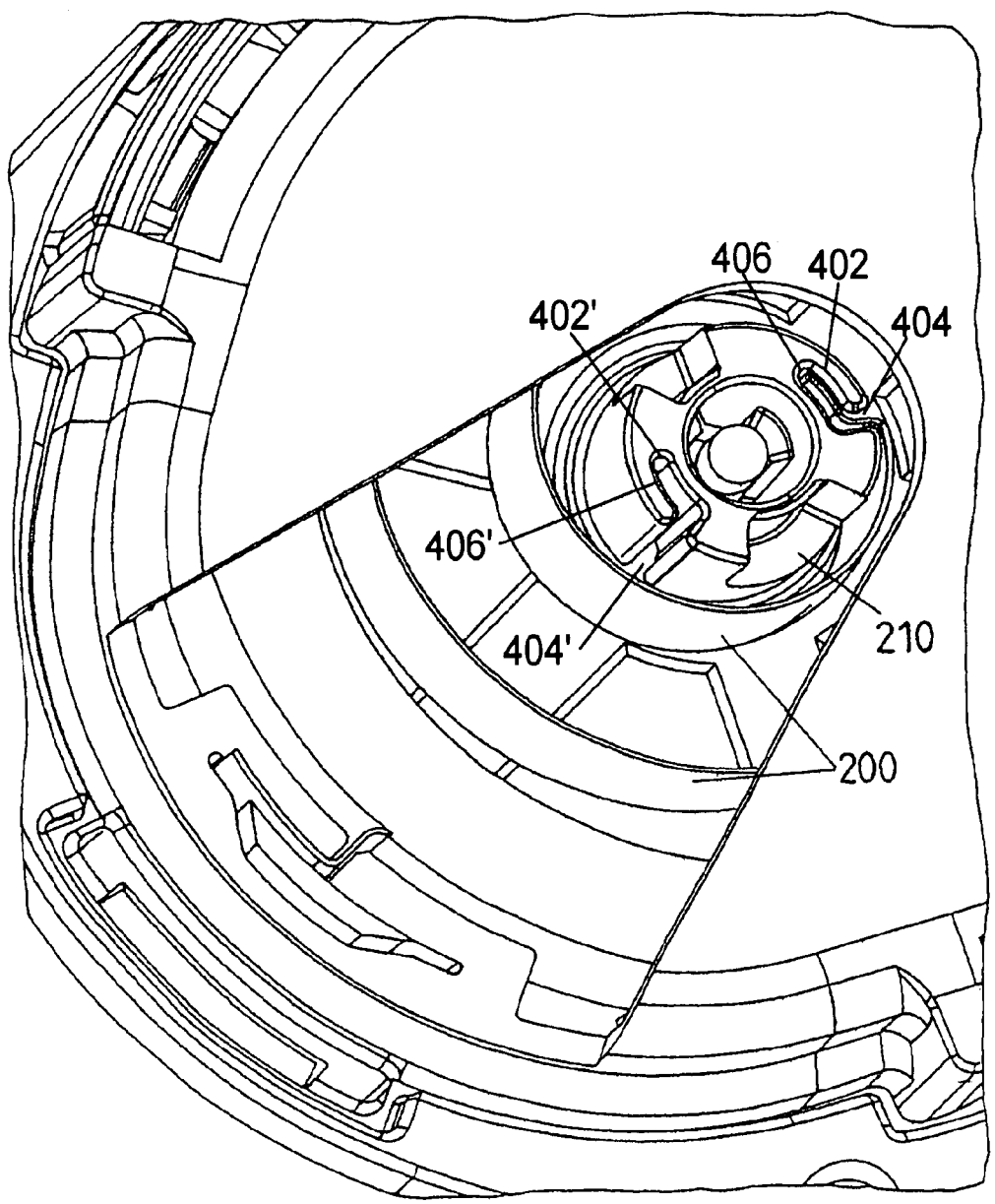

FIGS. 4a and 4b each illustrate, in a three-dimensional illustration, the manner in which the belt-retractor spring-cassette cover 60 according to FIG. 3 or the belt-retractor spring-cassette cover according to FIGS. 1 and 2 can be constructed in the "interior". A driving spring 200 which is held in a spring core 210 can be seen.

It can also be seen in FIGS. 4a and 4b that the fixing of the driving spring 200 in the belt-retractor spring-cassette cover 60 is symmetrical. The spring fixing in the spring core 210 is also symmetrical.

As can be seen in FIGS. 4a and 4b, the spring core 210 is configured to retain a driving spring 200, wherein the spring core 210 has two receiving openings 402, 402' suitable for hooking in the driving spring 200. Each of the two receiving openings 402, 402' has an outlet slot 404, 404' from which the driving spring 200 emerges in an event of being unhooked from the spring core 210, and a hook-in region 406, 406' adjoining the outlet slot 404, 404'. Each of the hook-in regions 406, 406' extends concentrically with a central axis of the spring core. The hook-in region 406 of one receiving opening 402 extends in a counterclockwise direction as seen from its associated outlet slot 404 and the hook-in region 406' of the other receiving opening 402' extends in a clockwise direction as seen from its associated outlet slot 404'.

FIG. 5 shows the belt-retractor spring-cassette cover 60 according to FIGS. 4a and 4b once again in an illustration of a detail. Specifically, FIG. 5 shows construction drawings of the belt-retractor spring-cassette cover 60 with different cross sections and views. In this case, the belt-retractor spring-cassette cover 60 is already fastened on a spring-cassette connecting plate 300 which is fastened later in turn on the belt retractor.

FIG. 5 also shows the driving spring 200 which is held in the spring core 210. In this case, the fastening of the driving spring 200 in the spring core 210 is illustrated in detail in detailed views.

The priority application, Germany Patent Application No. 103 20 836.4, filed May 8, 2003, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A belt-retractor device comprising:
   a belt-retractor spring-cassette housing, and
   a spring core configured to retain a driving spring,
   wherein the belt-retractor spring-cassette housing, the spring core, or a combination thereof is designed symmetrically so that driving springs of different torque directions are insertable into the belt-retractor device,
   wherein the spring core has two receiving openings suitable for hooking in the driving spring,
   wherein each of the two receiving openings has an outlet slot from which the driving spring emerges in an event of being unhooked from the spring core, and a hook-in region adjoining the outlet slot,
   wherein each of the hook-in regions extends concentrically with a central axis of the spring core, and
   wherein the hook-in region of one receiving opening extends in a counterclockwise direction as seen from its associated outlet slot and the hook-in region of the other receiving opening extends in a clockwise direction as seen from its associated outlet slot.

2. The belt-retractor device of claim 1, wherein the belt-retractor spring-cassette housing comprises a belt-retractor spring-cassette cover.

3. The belt-retractor device of claim 1, wherein each receiving opening comprises a region of curvature situated between the outlet slot and the hook-in region.

4. The belt-retractor device of claim 3, wherein the region of curvature forms a right angle.

5. The belt-retractor device of claim 1, wherein the two receiving openings lie diametrically opposite to each other.

6. A belt retractor, comprising:
   a spring-cassette connecting plate connected to a belt-retractor spring-cassette housing, and
   a spring core configured to retain a driving spring,
   wherein the belt-retractor spring-cassette housing, the spring core, or a combination thereof is designed symmetrically so that driving springs of different torque directions are insertable into the belt-retractor,
   wherein the spring core has two receiving openings suitable for hooking in the driving spring,
   wherein each of the two receiving openings has an outlet slot from which the driving spring emerges in an event of being unhooked from the spring core, and a hook-in region adjoining the outlet slot, and
   wherein each of the hook-in regions extends concentrically with a central axis of the spring core, and
   wherein the hook-in region of one receiving opening extends in a counterclockwise direction as seen from its associated outlet slot and the hook-in region of the other receiving opening extends in a clockwise direction as seen from its associated outlet slot.

7. The belt retractor of claim 6, wherein the spring-cassette connecting plate has a symmetrical construction such that the belt-retractor spring-cassette housing can be connected for any desired spring-torque direction.

8. The belt retractor of claim 6, wherein the belt retractor is designed so that any desired belt-retracting directions of rotation of a belt spindle are possible, and the belt-retracting direction of the belt retractor is determined exclusively by the torque direction of the driving spring.

9. The belt retractor of claim 8, wherein the belt retractor includes a belt-strap sensor device, a vehicle sensor, or a combination thereof.

10. The belt retractor of claim 6, wherein the belt retractor includes a sensor device.

11. The belt retractor of claim 10, wherein the belt-retractor spring-cassette housing is fitted onto the sensor device.

12. The belt retractor of claim 11, wherein the sensor device is configured so that, when the belt-retractor spring-cassette housing is fitted onto the sensor device, a transmission of force between the driving spring of the belt-retractor spring-cassette housing and a belt spindle of the belt retractor is ensured.

13. The belt retractor of claim 10, wherein the spring-cassette connecting plate is formed by an outer side of the sensor device.

14. The belt retractor of claim 10, wherein the sensor device and the spring-cassette connecting plate are arranged on different sides of the belt retractor.

* * * * *